Aug. 7, 1956

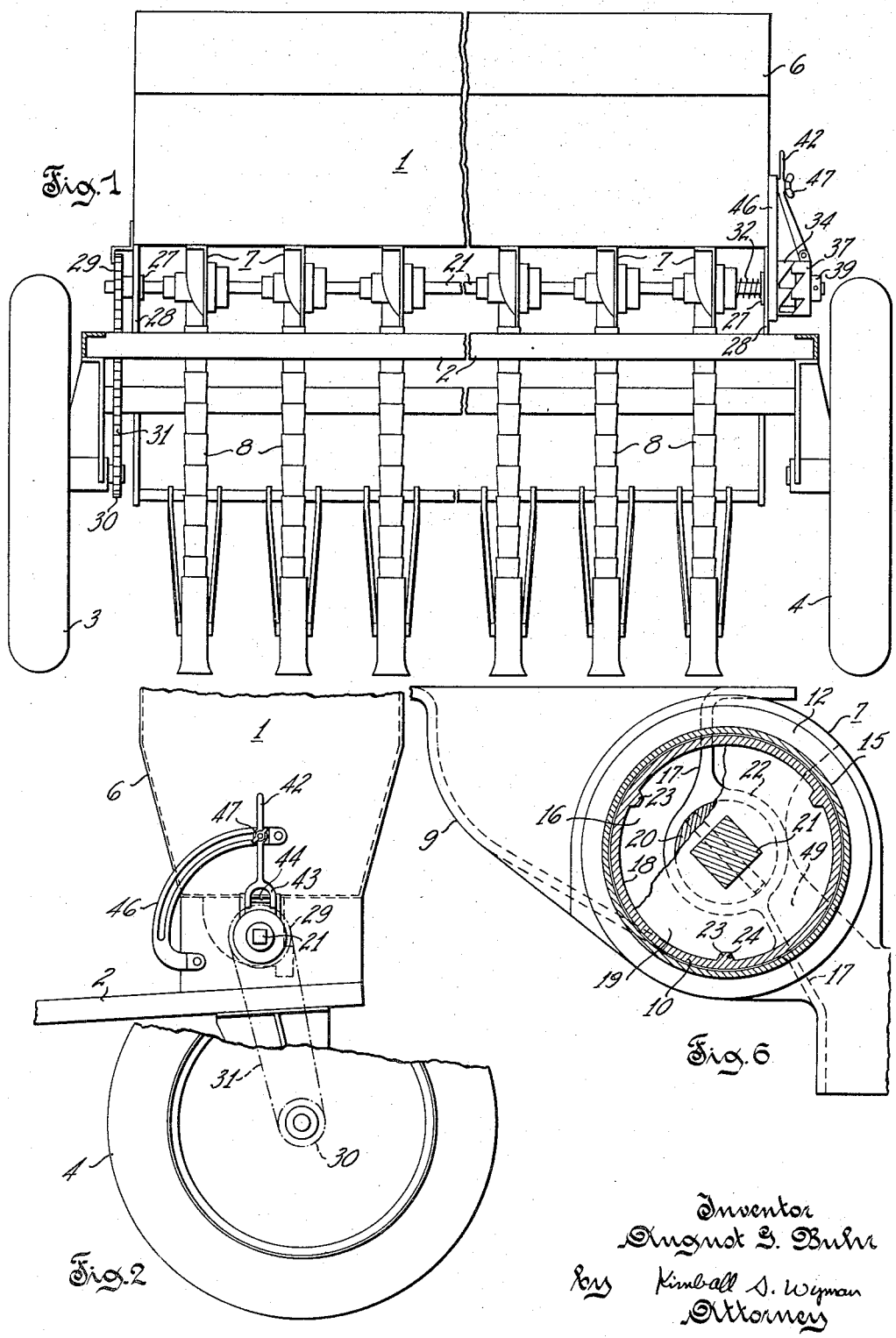

A. G. BUHR 2,757,825

SEED RATE ADJUSTMENT

Filed July 6, 1953

Inventor
August G. Buhr
by Kimball S. Wyman
Attorney

United States Patent Office 2,757,825
Patented Aug. 7, 1956

2,757,825

SEED RATE ADJUSTMENT

August G. Buhr, La Crosse, Wis., assignor to Allis-Chalmers Manufacturing Company, Milwaukee, Wis.

Application July 6, 1953, Serial No. 366,301

6 Claims. (Cl. 222—294)

This invention relates to seed planters and more particularly to a mechanism for adjusting the rate at which seed is discharged from a seed confining structure or hopper.

In planters and particularly in grain drills, a seed dispensing device is operatively associated with each seed containing hopper to feed seed therefrom at a predetermined rate into a tube which conveys the seed to a furrow in the soil. Certain seed dispensing devices include a rotating feed element or cylinder which is mounted within a cup structure depending or projecting from the seed containing hopper. Adjustment of the rate at which seed is fed from the hopper is obtained by varying the axial length of the seed feeding surface of the cylindrical feed element which coacts with the cup structure to control the rate of seed discharge therefrom. This is accomplished by mounting the feed element on a rotatable feed shaft supported for axial movement relative to the cup structure. In a grain drill, the seed dispensing devices are mounted on a common shaft which is similarly supported so that all of the feed elements are similarly and simultaneously adjusted.

It is very desirable that the feed cylinders may be adjusted easily and accurately. Many devices have been provided to thus accomplish this adjustment but all have disadvantages in that adjustment in one direction necessitates moving a feed element, which may be a part of the feed cylinder, against seed contained in the cup structure. In such cases, the seed confined within the cup resists movement of the feed element and consequently the seed in the cup may be crushed or cracked in effecting adjustment which in turn may result in damage to the seed dispensing device. This is particularly true in the case of a grain drill where a plurality of feed elements are adjusted simultaneously since even if the adjustment is attempted to be made gradually, it is extremely difficult, if not impossible, to simultaneously clear the seed from all of the cup structures.

Further, a gradual adjustment necessitates the operator attempting to shift the axially movable elements of the rotating feed cylinders axially in gradual amounts as the grain drill or planter moves forward during the planting operation. Such an adjustment is particularly difficult where the grain drill is drawn by a tractor since it is usually necessary to stop and start the tractor a number of times before the desired adjustment is finally achieved. Of course if two operators are available, one for the tractor and one for effecting the seed rate adjustment, the difficulty is readily overcome, but the cost is excessive.

It is therefore an object of this invention to provide a planter wherein the rate of feed of the seed can be readily adjusted without breaking or cracking the seed and/or without damaging the dispensing device.

It is a further object of this invention to provide a planter wherein the rate of feed of the dispensing device may be adjusted readily by one operator simply by effecting a single movement of a selectively positionable control element.

It is a further object of this invention to provide a planter wherein the rate of feed of the dispensing device may be obtained accurately and when once obtained will not vary.

These and other objects and advantages will be apparent from the following description of a preferred embodiment of the invention and from the accompanying drawings, in which:

Fig. 1 is a front view of a grain drill broken away at the center to avoid a repetition of parts;

Fig. 2 is a side view of the grain drill shown in Fig. 1;

Fig. 6 is a view of the seed dispensing device taken on line VI—VI of Fig. 4.

Figures 3, 4, 5:
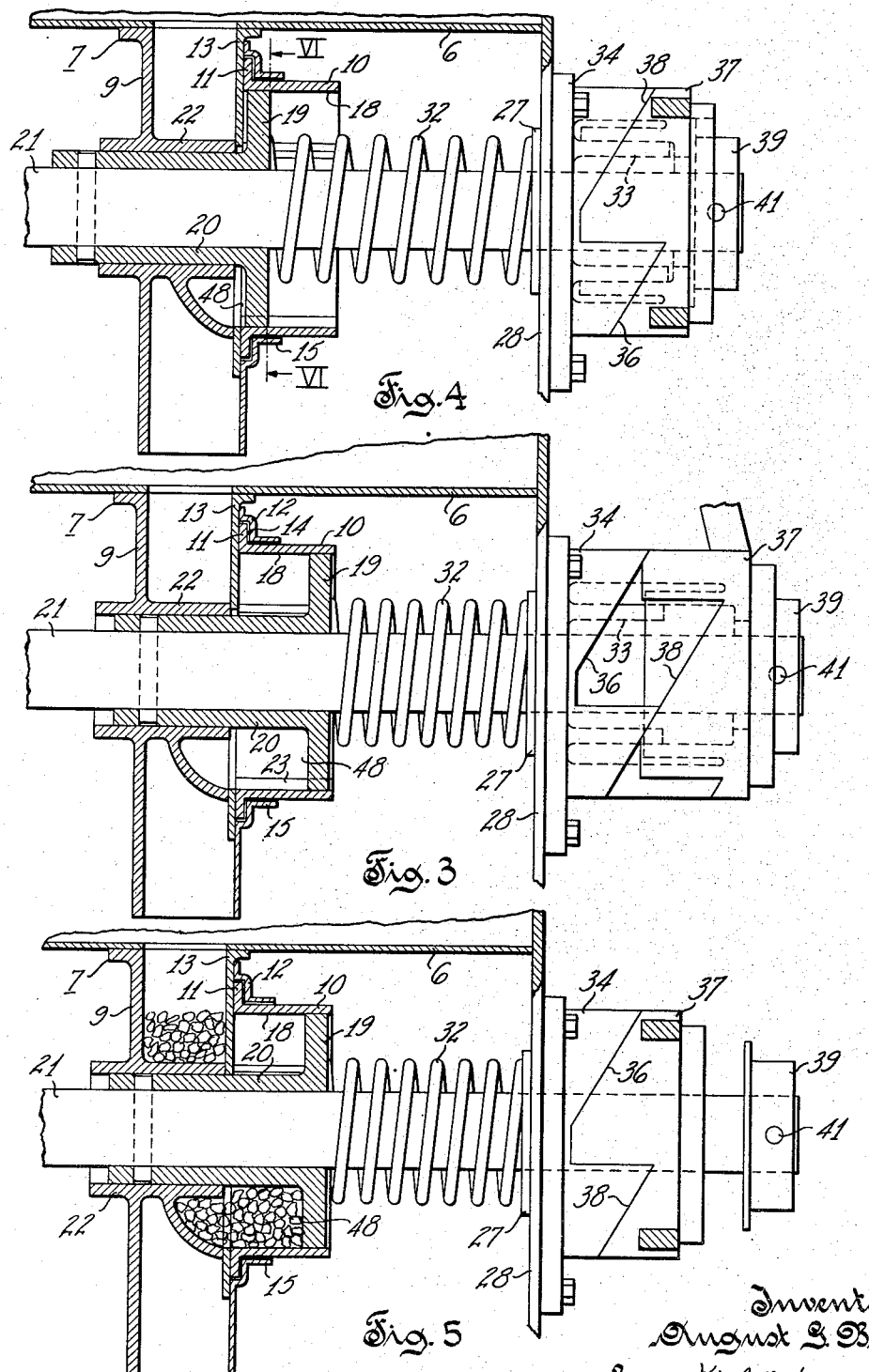
Fig. 3 is an enlarged partial vertical longitudinal section through one of the seed dispensing devices and the adjusting mechanism which is seen at the right side of the grain drill shown in Fig. 1.
Fig. 4 is a view similar to that of Fig. 3 but showing a different position of the adjusting mechanism.
Fig. 5 is a view similar to that of Figs. 3 and 4 illustrating what occurs when there is seed in the cup structure and the cam means is moved from the position shown in Fig. 3 to the position shown in Fig. 4.

Referring to Fig. 1, a grain drill 1 having a main frame 2 supported on ground wheels 3 and 4 carries a transversely extending seed hopper 6 at the bottom of which are mounted a plurality of laterally aligned, similar seed dispensing devices 7 which feed the seed stored in the hopper 6 to tubes 8 through which the seed is conveyed to furrows in the ground.

The seed dispensing devices 7 (note Figs. 3 and 6) are known as an internal rim feed type and each comprises a seed confining structure or cup 9, a feed cylinder 10 presenting a peripheral radial flange 11 at the cup end thereof, a ring 12 which is fixed to the side wall 13 of the cup structure and presents a portion spaced from the wall 13 to form therewith an annular space 14 rotatably receiving the feed cylinder flange 11 and a cylindrical sleeve portion 15 supportingly surrounding the feed cylinder 11. The feed cylinder is thus supported for rotation relative to the cup structure with the internal space of the cylinder at the flanged end thereof disposed in seed receiving relation to a discharge opening 16. As shown in Fig. 6, opening 16 is defined by the left side of an internal partition structure 17 of the cup 9 and by the internal surface portion 18 of the feed cylinder 11 which is disposed opposite the left side of the partition structure 17.

The feed cylinder 10 includes a seed confining or partition element 19 having a coaxial sleeve portion 20 fixedly secured to a feed shaft 21 rotatably supported in a hollow cylindrical bearing or journal 22 formed in the internal partition structure 17 of the cup 9. The inner peripheral surface of feed cylinder 10 is provided with a series of axially extending circumferentially spaced ribs 23 and the peripheral edge of partition 19 is provided with a similar series of axially extending complementary notches or grooves 24 receiving the internal ribs 23 on feed cylinder 10. This coaction of the feed cylinder and its internal partition part 19 establishes a driving connection therebetween whereupon rotation of shaft 21 effects a simultaneous rotation of feed cylinder 10. Also the association between bearing 22 and the sleeve portion 20 fixed to shaft 21 is such as to permit axial movement of the sleeve and shaft relative to the journal.

Feed shaft 21 is common to and similarly drivingly connected to the feed cylinder 10 and partition part 19 of each seed dispensing device in the manner just described. In addition, the opposite ends of shaft 21 are supported for rotation and axial movement by means of suitable bearing structures 27 fixed in mounting brackets 28 depending from the bottom of hopper 6 adjacent the opposite ends thereof. Rotation of shaft 21 is attained by a sprocket 29 non-rotatably fixed on the left end thereof as viewed in Fig. 1, sprocket 29 being aligned with a conventional one-way driving sprocket 30 on the adjacent ground wheel 3 and drivingly connected with the latter by a chain 31. Consequently, it will be apparent that shaft 21 will be rotated whenever the drill is traveling forward as is the usual practice. Further, it is to be understood that the operative association of shaft 21 and sprocket 29 is of known construction and such that the former may move axially relative to the latter.

Referring to Figs. 3, 4 and 5, shaft 21 is held in the position shown, that is with the partition part 19 of feed cylinder 10 in close proximity to the side wall 13 of cup structure 9, by means of a compression spring 32 which surrounds the portion of shaft 21 between the bearing 27 at the right end thereof and the partition part 19 of the feed cylinder 10 next adjacent thereto. Shaft 21 projects outward beyond the right end bearing 27 and the hub portion 33 of a stationary cam member or element 34 secured to the outside of the bearing supporting bracket 28. Shaft 21 is rotatable in and movable axially relative to cam element 34, and the sleeve portion 20 of each feed cylinder partition part 19 is of course similarly associated with the cylindrical bearing or journal portion 22 formed in the cup structure 9 of each seed dispensing device, as previously indicated.

The axially outer end of element 34 is provided with one-way clutch type cam surfaces 36. Cam means including a member or an element 37 provided with complementary cam surfaces 38 is rotatably supported on shaft 21 with its cam surfaces abutting those on element 34 and with its outer side engaging a collar 39 fixed on shaft 21 by means of a pin 41. Element 37 is provided with an actuating lever 42 having a bifurcated end 43 operatively pivoted thereto by means of a pin 44 and having its opposite or handle end operatively associated with a slotted quadrant 46 for selectively fixed engagement therewith by means of a bolt and wing nut means 47.

As previously indicated, one end of compression spring 32 engages the fixed bearing structure 27 and consequently the opposite end of the spring acts on partition part 19 of the adjacent feed cylinder 10 to retain the coacting cam surfaces 36 and 38 in axial abutment. Consequently, it should now be apparent that movement of the actuating handle from the position indicated in Fig. 4 to the position shown in Figs. 1 and 3, operates through the coaction of cam surfaces 36 and 38 to positively move shaft 21 and partition part 19 of each feed cylinder 10 axially toward the right and to the limiting position shown in Figs. 1, 3 and 5.

In operation, the cup structure 9 is normally filled with seed and upon rotation of shaft 21, each feed cylinder 10 and its partition part 19 rotate therewith. Seed in the cup 9 flows through the discharge opening 16 onto the inner surface of cylinder 10, the lateral extent of seed flow or the extent of the seed cavity 48 being determined by the axial position of partition part 19 relative to cylinder 10 and the opposed edge of internal wall structure 17. Rotation of the dispensing device continuously conveys seed past the feed cylinder edge of internal partition structure 17 and into the space 49 on the opposite side of the wall structure 17, the seed being thus delivered to the depending tube 8 which conveys seed to the furrow formed in the ground therebeneath.

If it now be assumed that the seed cavity 48 is a minimum, i. e., such as is indicated by the relative positions of cylinder 10, partition part 19 and the cam elements 34, 37 shown in Fig. 4, and it is desired to increase the rate of seed feed, all that has to be done is release actuating lever 42 for movement relative to quadrant 46 and move the lever 42 in the direction producing a clockwise rotation of cam element 37 relative to cam element 34 as viewed from the right end of Fig. 4. Due to the shape of the complementary cam surfaces 36, this rotation of cam element 37 positively moves shaft 21 to the right further compressing spring 32 as previously described. When this has been done, the wing nut is tightened thus retaining the lever 42 in the selected position of increased seed feed which, if desired, may be the maximum extent of increase shown in Figs. 1 and 3. As previously indicated, this adjustment simultaneously and positively moves all of the seed feeding devices to exactly the same extent, and they are all retained in their selected position by tightening the wing nut means fixing lever 42 to quadrant 46.

When it is desired to decrease the rate of seed feed, the wing nut means 47 is released and the lever actuated to rotate the cam element 37 relative to cam element 34 in a counterclockwise direction as viewed from the right side of Figs. 3 and 5. However, if the cup 9 is filled with seed as indicated in Fig. 5, cam element 37 moves axially toward element 34 but the confined seed prevents spring 32 from immediately effecting a corresponding movement of the partition part 19 and shaft 21. However, spring 32 is constantly acting to effect such movement and as the feeding of seed continues the partition part 19 and shaft 21 are automatically moved to the selected position of decreased seed rate without crushing the seed confined between the walls of the cup structure and the part 19.

In other words, the spring 32 and the cam elements 34, 37 coact with each other and with the shaft 21 in a manner constituting a follow up lost motion mechanism affording movement of the cam means including the member 37 relative to the seed confining structure including the wall 13 of the feed device in a direction rendering the spring means operative to effect a follow up movement of element 19 toward the cup structure a preselected extent as determined by the movement of the cam means actuating lever 42.

It can now be seen that a seed rate adjusting mechanism has been provided which permits adjustment of the seed dispensing mechanism 7 to decrease the rate of discharge without forcing or damaging either the mechanism or the seed. It will also be noted that the rate of seed discharge can be adjusted from a maximum amount to a somewhat lesser rate without necessitating a number of gradual adjustments until the desired position is obtained. Furthermore, the spring 32 is effective to keep the two cam members 34 and 37 in engagement and therefore to maintain the disk in the same relation to the feed cylinder for any selected position of adjustment.

As previously indicated, the apparatus herein shown and described effectively accomplishes the objects and affords the advantages desired. However, it should be appreciated that the invention is applicable to seed feeding devices other than the internal rim type herein disclosed for purposes of illustration. Consequently, it is not intended to limit the invention to the details of construction, form and coaction of the illustrated apparatus constituting a preferred embodiment of the invention as various modifications within the scope of the appended claims may occur to persons skilled in the art.

It is claimed and desired to secure by Letters Patent:

1. In a seed planter, the combination of a seed confining structure having a discharge opening defined in part by a wall portion of said structure, means for varying the size of said discharge opening and including a seed confining element mounted on said structure for movement toward and away from said wall portion, spring means continuously acting to move said element toward said wall portion; and adjustable cam means operatively associated with said element for positively moving the latter away from said wall portion and retaining said element in a selected position spaced from said wall portion, said spring means and said cam means constituting a follow up lost motion mechanism affording movement of said cam means relative to said seed confining structure in a direction rendering said spring means operative to move said element toward said wall portion a preselected extent as determined by the said movement of said cam means.

2. In a seed planter, the combination of a seed confining structure having a discharge opening defined in part by a wall portion of said structure, a rotary seed dispensing device including a seed confining element mounted on said structure for axial adjustment toward said wall portion, said device being positioned in seed receiving relation to said opening, spring means continuously acting to move said element toward said wall portion; an adjustable cam means operatively associated with said element for positively moving the latter away from said wall portion and retaining said element in a selected position spaced from said wall portion, said spring means and said cam means constituting a follow up lost motion mechanism affording movement of said cam means relative to said seed confining structure in a direction rendering said spring means operative to move said element toward said wall portion a preselected extent as determined by the said movement of said cam means.

3. In a seed planter, the combination of a seed confining structure having a discharge opening defined in part by a wall portion of said structure, a shaft rotatably mounted to extend through said structure adjacent to said discharge opening, said shaft being axially adjustable relative to said structure, a rotary seed dispensing device operatively mounted on said structure in seed receiving relation to said discharge opening and including a seed confining element secured to said shaft for rotation and axial movement therewith, spring means continuously acting to move said shaft and said element toward said wall portion, and adjustable cam means operatively associated with said shaft for positively moving said element away from said wall portion and retaining said element in a selected position spaced from said wall portion, said spring means and said cam means constituting a follow up lost motion mechanism affording movement of said cam means relative to said seed confining structure in a direction rendering said spring means operative to move said element toward said wall portion a preselected extent as determined by said movement of said cam means.

4. In a seed planter, the combination of a seed confining structure having a discharge opening defined in part by a wall portion of said structure, a rotary seed dispensing device mounted on said structure and including a rotating cylindrical element, a disk element mounted within said cylindrical element for axial adjustment relative thereto toward and away from said wall portion, spring means urging said disk to a predetermined position relative to said cylindrical element and toward said wall portion, and adjustable cam means operatively associated with said disk for positively moving the latter away from said wall portion and retaining said disk in a selected position spaced from said wall portion, said spring means and said cam means constituting a follow up lost motion mechanism affording movement of said cam means relative to said seed confining structure in a direction rendering said spring means operative to move said disk relative to said cylindrical element and toward said wall portion a preselected extent as determined by the said movement of said cam means.

5. In a seed planter, the combination of a seed confining structure having a discharge opening defined in part by a wall portion of said structure, a shaft rotatably mounted to extend through said structure adjacent to said discharge opening, said shaft being axially adjustable relative to said structure, a rotary seed dispensing device mounted on said structure and including a rotating cylindrical element, a disk element mounted within said cylindrical element and on said shaft for axial adjustment with said shaft relative to said cylindrical element toward and away from said wall portion, spring means operatively interposed between said structure and said disk and urging said disk to a predetermined position relative to said cylindrical element and toward said wall portion, and adjustable cam means operatively associated with said shaft and said disk for positively moving the latter away from said wall portion and retaining said disk in a selected position spaced from said wall portion, said spring means and said cam means constituting a follow up lost motion mechanism affording movement of said cam means relative to said seed confining structure in a direction rendering said spring means operative to move said shaft and said disk relative to said cylindrical element and toward said wall portion a preselected extent as determined by the said movement of said cam means.

6. In a seed planter, the combination of a seed confining structure having a discharge opening defined in part by a wall portion of said structure, means for varying the size of said discharge opening and including a seed confining element mounted on said structure for movement toward and away from said wall portion, spring means continuously acting to move said element toward said wall portion, and adjustable cam means operatively associated with said element for positively moving the latter away from said wall portion and retaining said element in a selected position spaced from said wall portion, said cam means including a cam member mounted for back and forth movement relative to said wall portion and selectively adjustable to predetermined positions relative to the latter, said spring means being operative upon movement of said cam member toward said wall portion to move said seed confining element from said selected position and toward said wall portion a preselected extent as determined by the movement of said cam member.

References Cited in the file of this patent

UNITED STATES PATENTS

| Re. 8,938 | Sheldon | Oct. 21, 1879 |
| 7,930 | Pennock | Feb. 11, 1851 |
| 281,602 | Allen | July 17, 1883 |
| 671,587 | Denyes et al. | Apr. 9, 1901 |
| 956,545 | Rowell | May 3, 1910 |
| 1,480,337 | Ayars | Jan. 8, 1924 |
| 2,115,167 | Hoke | Apr. 26, 1938 |